W. K. LEONARD.
VEHICLE TIRE.
APPLICATION FILED AUG. 25, 1911.

1,140,752. Patented May 25, 1915.

Witnesses,
S. S. Mann
S. N. Pond

Inventor,
William K. Leonard.
By Offield, Towle, Graves & Offield
Attys.

UNITED STATES PATENT OFFICE.

WILLIAM K. LEONARD, OF PIQUA, OHIO.

VEHICLE-TIRE.

1,140,752.

Specification of Letters Patent. Patented May 25, 1915.

Application filed August 25, 1911. Serial No. 645,988.

*To all whom it may concern:*

Be it known that I, WILLIAM K. LEONARD, a citizen of the United States, residing at Piqua, in the county of Miami and State of Ohio, have invented certain new and useful Improvements in Vehicle-Tires, of which the following is a specification.

This invention relates to the art of soft-tread tires, and the primary object of the invention is to provide a practical substitute for the compressed air-cushion of the well-known pneumatic tire, together with a practical means for taking up the slight shrinkage which may occur in the rubber substitute material which I employ as a core for the tire in lieu of the usual pneumatic core, or compensate for stretching of the outer casing.

In carrying out my invention I mold a rubber substitute in such shape as to snugly fit within the ordinary outer casing of the tire and vulcanize the same to the latter, and I provide means for neutralizing the effect of the slight shrinkage which may occur within the body of the rubber substitute, or of the stretching of the casing, such means, in its preferred form, taking the form of a spring base which, by drawing together the sides or flanges of the tire-holding rim, may be expanded radially so as to expand and force the material of the core into a snug fit with the casing.

My invention, its advantages, and its manner of use will all be readily understood when considered in connection with the accompanying drawings, in which—

Figure 1:
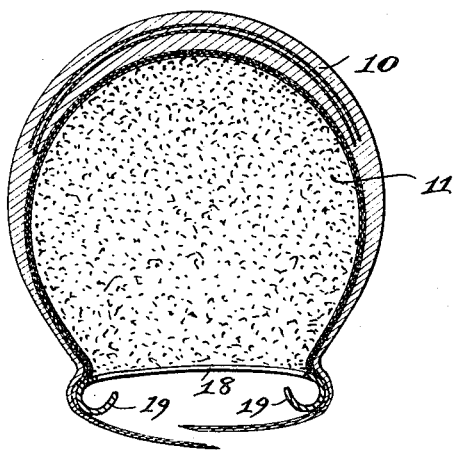
Figure 2:
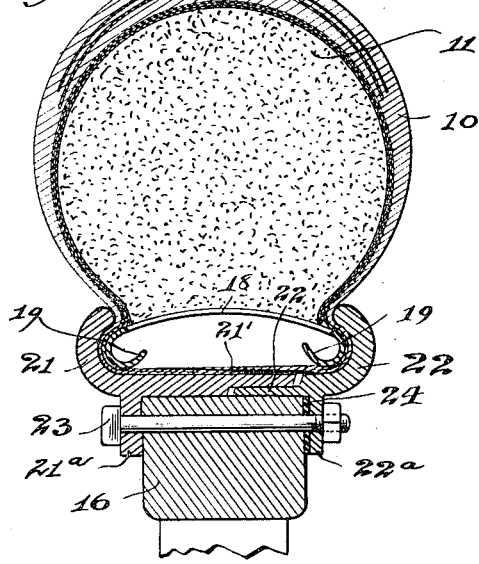
Figure 3:
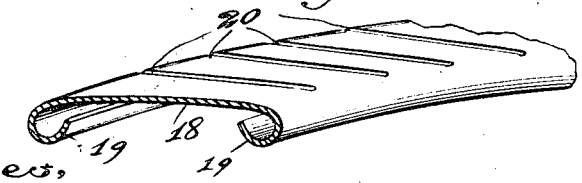

Figure 1 is a cross-sectional view of a tire casing and core equipped with an expanding ring for taking up shrinkage of the core or stretching of the casing. Fig. 2 shows the structure of Fig. 1 secured to the rim and felly of a wheel, and with the core-expanding ring compressed. Fig. 3 is a perspective elevation of a fragment of the core-expanding ring.

Referring to the drawings, 10 designates as an entirety an ordinary outer casing of a pneumatic tire, such as is used on automobile wheels, and 11 designates the core of my improved tire designed to fit snugly within the casing 10, and consisting of any suitable rubber substitute. The particular material employed for this rubber substitute is not of the essence of the invention, it being sufficient for the purposes of the invention that such rubber substitute shall possess substantially all the qualities of soft rubber, so as to form a resilient core which may serve as a practical substitute for the body of compressed air which constitutes the core of the ordinary pneumatic tire. I may state, however, that the rubber substitute which I preferably employ is that forming the subject matter of Letters Patent No. 615,863, granted to me December 13, 1898, and consisting of corn-oil, sulfur and paraffin vulcanized into a spongy resilient mass. The core is fitted within the casing 10 and preferably vulcanized to the latter. I insert between the rim and the base of the core a transversely expansible and compressible ring 18, preferably of the form shown in Fig. 3, and consisting of a thin steel hoop having its margins inwardly turned, as shown at 19 to conform substantially to the clencher flanges of the rim, and preferably transversely slotted at intervals as shown at 20 to thereby increase its transverse flexibility and expansibility. The broad intermediate portion of this ring or hoop engages the inner periphery of the core member 11, as clearly shown in Figs. 1 and 2, and the turned-in margins 19 with the overlapping marginal portions of the casing are securely clamped between clencher-rim sections 21 and 22. These latter are preferably formed with overlapping inner marginal portions 21' and 22' forming a lapped joint permitting of a limited degree of adjustment of the rim sections transversely of the tire and felly. The sections 21 and 22 are secured to the felly 16 by radial flanges 21ª and 22ª and a through-bolt 23; the adjustment being conveniently effected by one or more thin washers 24 that may be interposed between either or both of the securing flanges of the rim and the side of the felly. In this form of the invention, if the core shrinks, as it may do slightly depending somewhat upon the particular rubber substitute employed, or the casing stretches, by removing one or more of the washers 24 and tightening up the bolts 23, the expansion-ring 18 may be bowed or sprung outwardly, as illustrated in Fig. 2, thereby expanding the core sufficiently within the casing to compensate for shrinking or stretching and causing the core to again completely fill that part of the casing lying beyond the flanges of the rim.

It will be manifest to those skilled in the art of vehicle tires that the exact details of form and structure and relative arrangement of parts as shown in the drawings and hereinabove described might be considerably varied without involving any departure from the principles involved or sacrificing any of the merits and advantages of the invention. Hence, I do not limit the latter to the particular form shown except to the extent clearly indicated in specific claims.

I claim—

1. A tire comprising an outer casing, a core of rubber substitute within said casing a continuous annular core-expanding member of resilient metal within said casing engaging the inner periphery of said core and provided with inturned marginal edges, in combination with a two-part clamping rim having inturned marginal edges in overlapping relation to the inturned edges of said expanding member, and means for drawing the two parts of said clamping rim together for expanding said expanding member.

2. A tire comprising an outer casing, a core of rubber substitute within said casing, a core-expander consisting of a thin steel hoop having a transversely convex outer side slotted transversely at intervals engaging the inner periphery of said core and provided with inturned marginal edges, in combination with a two-part clamping rim having inturned marginal edges in overlapping relation to the inturned edges of said expander, and means for drawing the two parts of said clamping rim together for expanding said expander.

WILLIAM K. LEONARD.

Witnesses:
S. PEPPER,
O. G. STEINHILBER.